(12) United States Patent
Sojian (10) Patent No.: US 8,972,584 B2
(45) Date of Patent: Mar. 3, 2015

(54) REMOTE CARD READER ACCESS (75) Inventor: Lena Sojian, Fountain Valley, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 845 days.

(21) Appl. No.: 12/403,678

(22) Filed: Mar. 13, 2009

(65) Prior Publication Data

US 2010/0235470 A1 Sep. 16, 2010

(51) Int. Cl.
*G06F 15/16* (2006.01)
*G06F 9/54* (2006.01)
*H04L 29/08* (2006.01)
*G06Q 20/34* (2012.01)

(52) U.S. Cl.
CPC ...... *G06F 9/54* (2013.01); *H04L 67/12* (2013.01); *H04L 67/16* (2013.01); *G06Q 20/341* (2013.01); *H04L 67/02* (2013.01)
USPC ............................ 709/227; 709/203; 709/250

(58) Field of Classification Search
USPC .................. 709/223, 224, 202, 203, 227, 250
See application file for complete search history.

(56) References Cited

U.S. PATENT DOCUMENTS

| 7,130,910 | B2 | 10/2006 | Urien | |
|---|---|---|---|---|
| 2008/0245860 | A1* | 10/2008 | Polano | 235/382 |
| 2010/0100893 | A1* | 4/2010 | Klissner et al. | 719/328 |

FOREIGN PATENT DOCUMENTS

| JP | 04-367151 | 12/1992 |
|---|---|---|
| JP | 2003-345533 | 12/2003 |
| JP | 2008-004981 | 1/2008 |
| JP | 2008-067248 | 3/2008 |

* cited by examiner

*Primary Examiner* — David Lazaro
(74) *Attorney, Agent, or Firm* — Brooks Acordia IP Law, PC; Pejman Yedidsion; David Ripma (57) ABSTRACT Computing devices for providing a web service interface to a communication layer of the smartcard reader.

15 Claims, 9 Drawing Sheets

REMOTE CARD READER ACCESS

FIELD OF ENDEAVOR

The present invention, in its several embodiments, relates to computing devices for providing a web service interface and particularly related to providing a web service interface to a communication layer of a smartcard reader.

BACKGROUND

Smartcards and proximity cards provide numerous applications such as access control to systems and devices including data storage, and transaction management for electronic currency, e.g., eMoney. In today's security-sensitive world, smartcards offer a great advantage to providers of consumer devices and services. Smartcard support may be available in consumer and business electronic devices, such as Multi Function Peripherals (MFPs). A smartcard-based system typically includes a computer, a smartcard reader, and a smartcard. In standard system configurations, the smartcard reader is attached to the computer, e.g., a personal computer (PC), a workstation, or a mainframe system, and the smartcard-based computer system provides the necessary software components, executed as machine-readable instructions, in order to access the smartcard reader and, in turn, information of the smart card. A typical smartcard-based system software infrastructure within the computer system provides the communication protocol layer, i.e. the Input/Output (IO) drivers, in order for there to be communication with the reader device. Also, the computer system typically provides the communication software layer, i.e., the device drivers, in order to be in communication with the reader software. The computer system typically provides what is termed the card services layer in order to be in communication with the card. The computer system must provide the application layer that manages the application-specific data of the smartcard. Furthermore, the existence of numerous card formats and types only adds to the complexity of an already complex system. Given the complexities of smartcard-based systems, it is often times difficult, and sometimes impossible, to provide smartcard support within consumer devices or peripherals. Consumer devices may not have the necessary computing power and memory needed to implement the smartcard infrastructure.

A universal serial bus (USB) server allows USB data from one machine to be routed to another machine on the network. A USB-type reader may be attached to a remote machine, and the remote machine may function as a USB server to the attached USB reader. The remote machine typically provides special software that allows it to communicate over the network using a special port designated for its USB traffic. The application server also typically provides special software that listens on the port number designated for the USB traffic. This communication is bidirectional, and both machines implement special firmware to pack and unpack USB data over the network. While application servers may provide the capability to access remote smartcard readers on a different machine, USB-type readers are restricted, and this restriction effectively precludes the engagement of readers that utilize serial, a protocol according to the Personal Computer Memory Card International Association (PCMCIA), or other communication protocols. Additionally, USB over Ethernet may not provide the level of security needed for accessing the smartcard reader. For example, malicious applications may spoof the network to extract secure sensitive USB data. It should be noted that USB servers typically route all USB data. So, if the remote machine supports multiple USB devices, the USB data from all devices will be routed to the application server.

Figure 1:
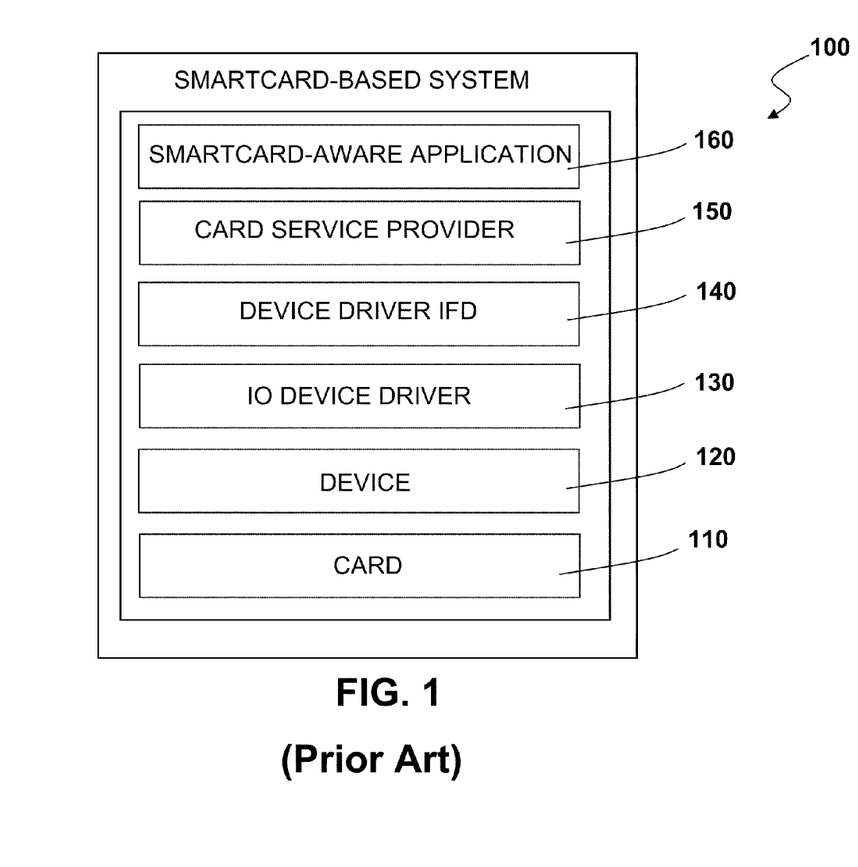
FIG. 1 is a depiction of the layers of a smartcard-based system.

FIG. 1 depicts the state of the art in a simplified diagrammatic representation of the layers in a smartcard-based computer system 100. The layers that are depicted are: the card layer 110, the device layer 120, the IO device driver layer 130, the device driver, i.e., the interface device (IFD) layer 140, the card service provider 150, and the smartcard-aware application 160. The configuration of these layers is dictated by numerous industry standards and protocols, such as: ISO 7816; ISO 14443; ISO15693; HID™ re: radio frequency identification (RFID); iCLASS™ re: contactless communication; Mifare™ re: wireless transmission; Indala™ re: proximity; and Common Access Card (CAC) protocols.

The configuration of a smartcard-based system may be complex, and require considerable software infrastructure within the computer system. In some smartcard-based application systems, the smartcard itself may be considered as performing functions. Classes of smartcards such as CAC, iCLASS, and Mifare are equipped with built-in processors and memory chips that require complex firmware drivers in order to extract user credentials and data from the card. Additionally, there are several standards that pertain to smartcards. For example, ISO 7816 defines a standard for contact-based smartcards, ISO 14443 defines a standard for short-range contactless cards, and ISO 15693 defines a standard for longer-range contactless, i.e., noncontact smartcards. In addition, communication over computer networks is typically accomplished in accordance with protocols that meet standards including several superimposed software layers. These layers include IP, TCP, HTTP, and SOAP. SOAP was originally defined as Simple Object Access Protocol, and is a protocol specification for exchanging structured information in the implementation of web services in computer networks. SOAP relies on Extensible Markup Language (XML) as its message format and, for message negotiation and transmissions, SOAP typically relies on other Application Layer protocols, such as Remote Procedure Call (RPC) and HTTP.

The Personal Computer/Smart Card (PCSC) specifications define an industry standard infrastructure for supporting the numerous smartcard technologies within the computing environment. PCSC is predominantly used within the WINDOWS™ and LINUX™ operating systems, and supports the numerous industry standard protocols related to smartcard and proximity cards. Accordingly, PCSC has become a de facto standard for smartcard support. Many manufacturers and providers of smartcard and smartcard devices offer PCSC versions of their products and services.

Figure 2:
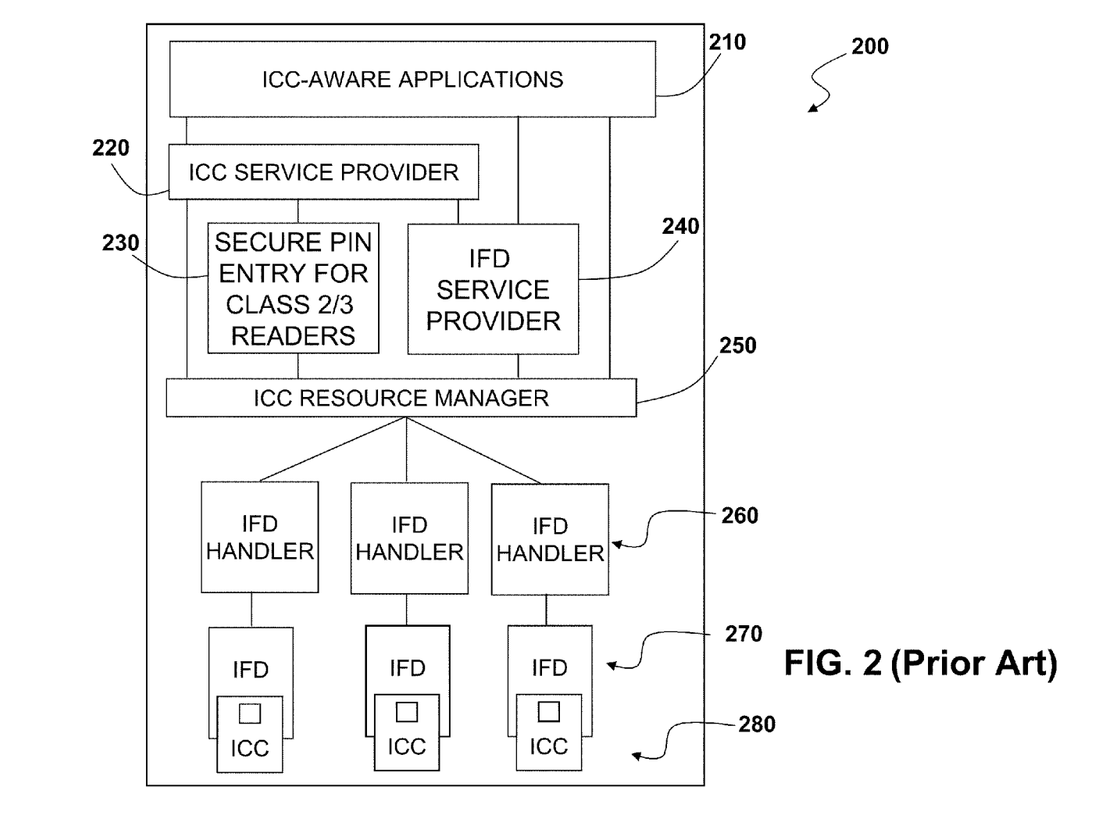
FIG. 2 is a representation of an ICC/IFD layered hierarchy.

FIG. 2 is a diagram depicting the state of the art as to PCSC architecture 200. Codes for smartcards are under the auspices of the International Code Council (ICC) and are integrated into the PCSC architecture. The top level is the ICC-aware applications level 210. The ICC service provider level 220 is subordinate to the ICC-aware applications level 210. The security pin entry for class 2/3 readers level 230 is subordinate to the ICC service provider level 220. IFD service provider level 240 is subordinate to both the ICC-aware applications level 210 and the ICC service provider level 220. The ICC resource manager level 250 is subordinate to all four of the preceding levels. The IFD handler level 260 is subordinate to the ICC resource manager level 250 and may comprise a plurality of individual IFD handlers. The IFD level 270 is subordinate to the IFD handler level 260, and is both superior to and functionally integral with the ICC cards/level 280.

SUMMARY

The invention, in its several embodiments, includes a system by which a PC Application Server may access smartcard devices, USB-type or by other communication means, attached to a Multi Function Peripheral (MFP) device via network connections including secure network connection by means, such as WS-Security. Some embodiments of the web service employ SOAP over HTTP, i.e., protocols that offer device access over proxies and firewalls.

Some embodiments of the present invention include a computing device comprising: a communication channel configured to interface with a smartcard reader; and a processing unit and addressable memory; where the processing unit is configured to establish a web service interface to a communication layer of the smartcard reader. The computing device may be logged into a computer network where the processing unit may be further configured to provide public availability of the web service interface to a remote computer device logged into the computer network. The processing unit of the computing device may be further configured to provide public availability of the web service interface, e.g., a publicly available reader web service interface, to a remote computing device logged into the computer network, and do so by executing machine instructions according to a web service description language. The processing unit of the computing device may be further configured to receive, from an application server of a device logged onto the computer network, the communication layer of the smartcard reader via the publicly available web service interface that may be provided by the processing unit. The processing unit of the computing device may be further configured to provide public availability of the web service interface to a first remote computing device logged into the computer network and block concurrent access to an interfaced smartcard reader by a second remote computing device. The processing unit of the computing device may be further configured to broadcast via the computer network the public availability of the web service for accessing an interfaced smartcard reader. The processing unit of the computing device may be further configured to transmit, to an application server logged onto the computer network, a change in at least one of: an availability state of the smartcard reader and an interface state of the smartcard reader.

Embodiments of the present invention may include a computing device comprising: a communication channel configured to interface with a computer network; and a processing unit and addressable memory comprising a system device list; where the processing unit is configured as an application server and is further configured to: (a) receive, from a remote computing device, a web service interface to a communication layer of a smartcard reader that is available; and (b) establish a resource in the system device list to make the smartcard reader available as a local resource to Personal Computer/Smart Card (PCSC) applications. The processing unit of the computing device may be further configured to transmit SOAP messages according to smartcard reader drivers of the application server to a remote machine interfaced with a smartcard reader device.

BRIEF DESCRIPTION OF THE DRAWINGS

Embodiments of the present invention are illustrated by way of example and not limitation in the figures of the accompanying drawings, and in which.

DETAILED DESCRIPTION

The present invention, in its several embodiments provides methods, devices, and systems for providing smartcard reader drivers for a smartcard web service at a computing node, such as an application server on a first networked computing device and for providing reader drivers for direct reader interface at a second computing node, such as an MFP.

Figures 3, 4B:
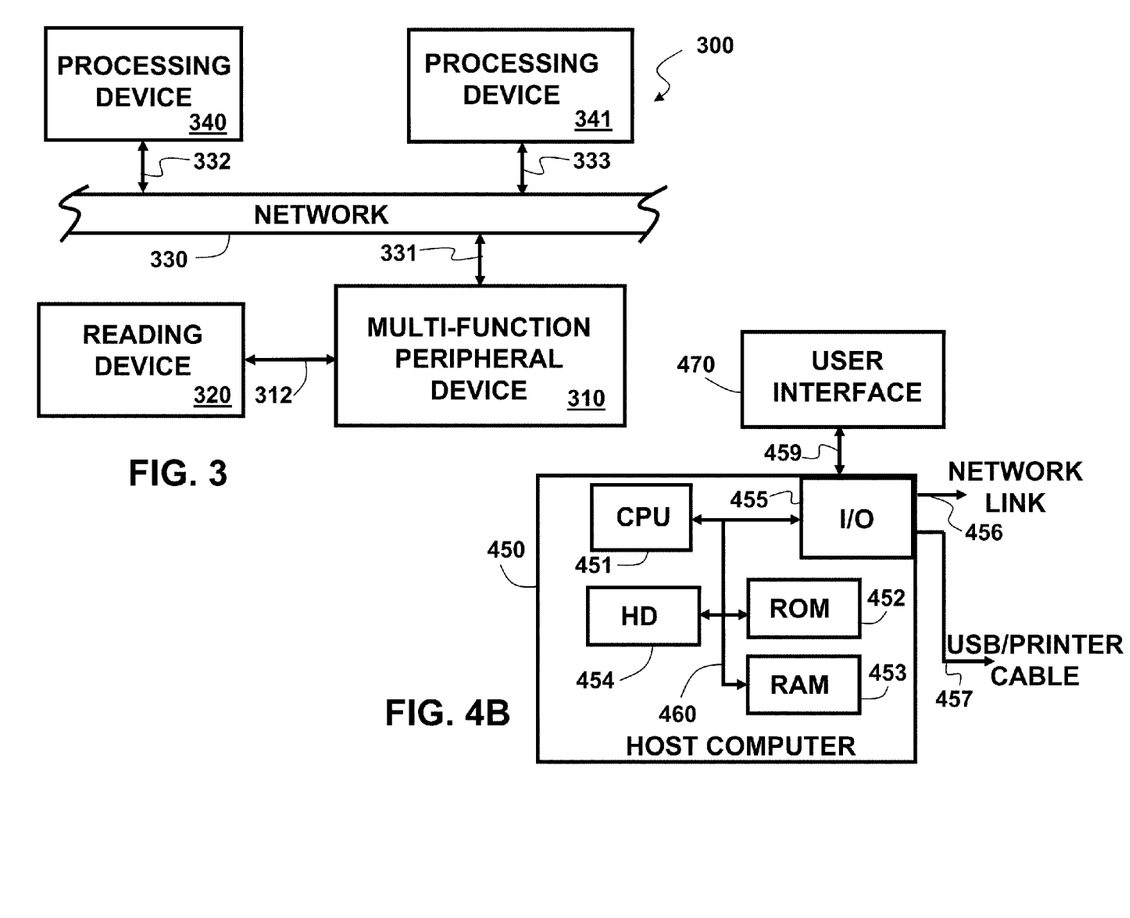
FIG. 3 is a top-level example of a computer network.
FIG. 4B is a top-level functional block diagram of an exemplary computing device.

FIG. 3 illustrates an exemplary system embodiment 300 of the present invention where a printing device or a multi-functional peripheral (MFP) device 310 may be in direct communication 312 with a smartcard reading device 320 that, in some embodiments, may be integrated into the chassis of the MFP. In addition, via a network 330 and a network link 331-333, the printing device or a multi-functional peripheral device 310 may be in communication with one or more processing devices 340, 341, such as one or more computers that may each host one or more drivers applicable to the printing device or the MFP device 310.

A remote machine, such as MFP, may comprise various CPU, ROM, RAM, IO devices, mass storage devices, and other hardware components necessary for proper functioning of the device. In addition to the hardware components required for proper functioning of the device, the remote machine also provides reader hardware. The reader may or may not be physically integrated into the device. The exemplary printing device or MFP device 310 of FIG. 3 may be illustrated in greater exemplary functional detail in FIG. 4A. Interface ports 402 may be present to connect a printer cable, a network link, or an external wireless module. The interface ports 402 may be serviced by one or more interface controllers 404 that function to direct communications and/or condition signals between the respective interface ports 402 and one or more modules of the MFP device 310 which may be in common communication via a data bus 406. The MFP device 310 may include one or more processing modules 408 that may draw data from read-only memory (ROM) 410 and exchange data with random access memory (RAM) 412 and may store files having sizes greater than the RAM 412 capacity in one or more mass storage units 414. The MFP device 310 may maintain a log of its images 416 and have a user display and interface 418. The image log 416 may be a separate module or distributed, for example, with a portion executed via the processing module 408 that may access parameters, files, and/or indices that may be stored in ROM 410, RAM 412, a mass storage unit 414 or in combination thereof. The MFP device 310 may include, as individual or separate modules, a scan control module 420, a facsimile (FAX) control module 422, and a copy control module 424 where each module may service the scanner 430 to direct communications and/or condition signals between the scanner 430 and one or more modules of the MFP device 310, for example, via the data bus 406. The MFP device 310 may include as individual or separate modules the FAX control module 422, the copy control module 424 and a print control module 426 where each module may service the printer 440 to direct communications and/or condition signals between the printer 440 and the one or more modules of the MFP device 310, for example, via the data bus 406. The exemplary MFP device 310 may store a calibration table in ROM 410, RAM 412, a mass storage unit 414, or in combination thereof, and accordingly, the calibration table may be accessed by the print control module 426 and/or a processing module 408 and made available to devices external to the MFP device 310 via one or more interface ports 402. The exemplary MFP device 310 may have notice, for example, due to a user input via the user interface 418 or sensed by an output orientation sensor 442 of the printer 440, and the notice may be communicated via the print control module 426 to devices external to the MFP device 310 via one or more interface ports 402. The smartcard reader 320 may comprise contact or contactless technologies, USB, serial, PCMCIA, or other connection methods. The reader technologies may comprise HID, Proximity, Mifare, or other technologies specific to reader devices. The smartcard reader 320 may or may not be physically integrated with the remote machine, i.e., the MFP.

Figure 4A:
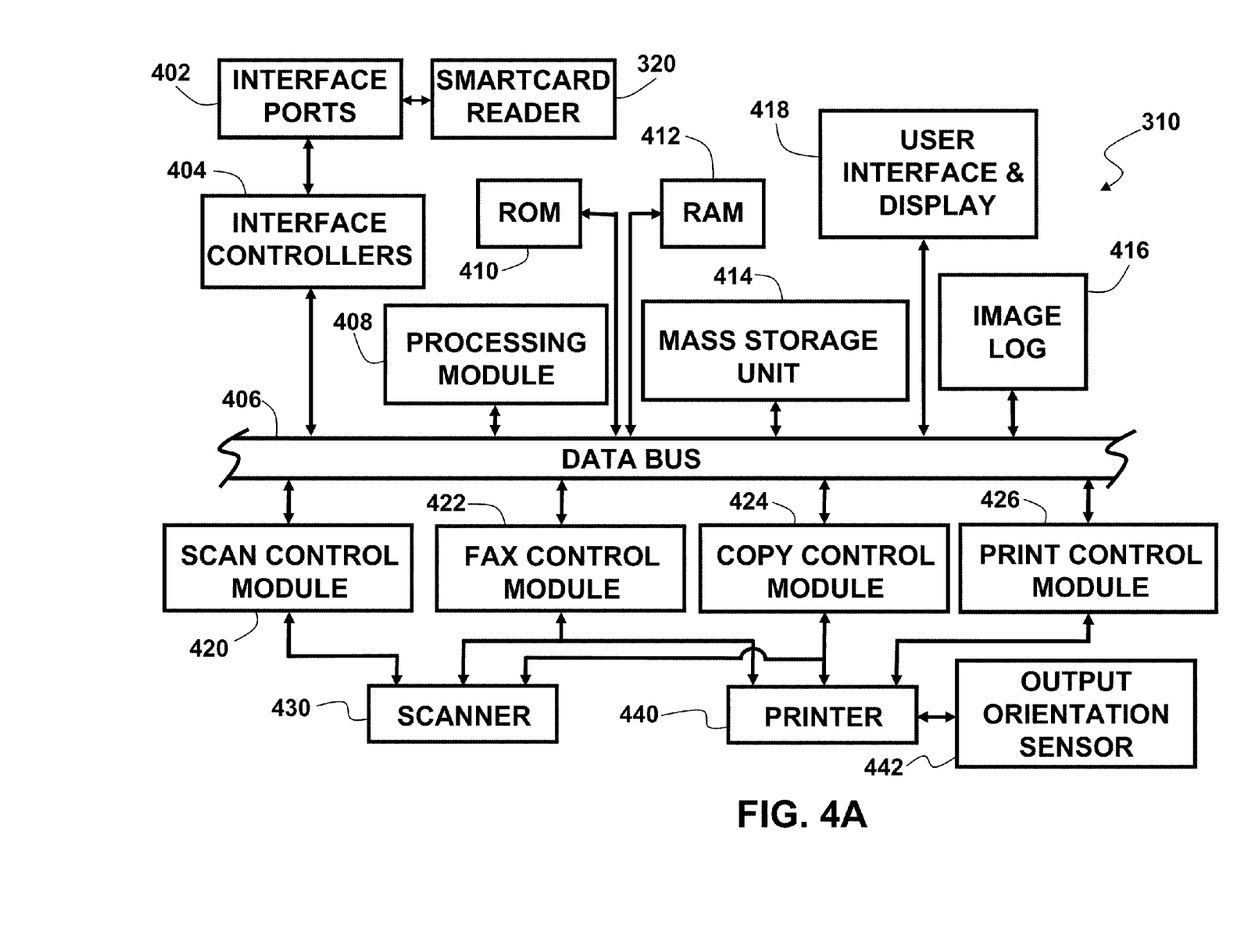
FIG. 4A is a top-level functional block diagram of an multifunctional peripheral (MFP) device.

FIG. 4B illustrates a top level functional block diagram of a processing device that is an exemplary host computer 450 that may host a driver embodiment of the present invention that, via an input/output interface 455 may interface 459 with the exemplary MFP device 310 of FIG. 4A via a wireless or wired network link 456 or a parallel, serial, or universal serial bus (USB) cable 457. The user interface 470 may include tactile input via keyboard, mouse and/or touch screen and/or audio input via a microphone. The user interface 470 may provide output to the user via a display, e.g. a graphical user interface (GUI), and/or provide audio output to the user via one or more speakers, headphones or ear buds. The host computer 450 may further comprise a central processing unit (CPU) 451, read only memory (ROM) 452, random access memory (RAM) 453 and a mass storage unit 454, such as a hard disk drive. Two or more elements of the host computer 450 may be in communication via a data bus 460. The general accessing of data, processing of data and communication and display of data may be handled at the CPU level of the host computer 451 by an operating system such as MICROSOFT™ WINDOWS™.

Figure 5:
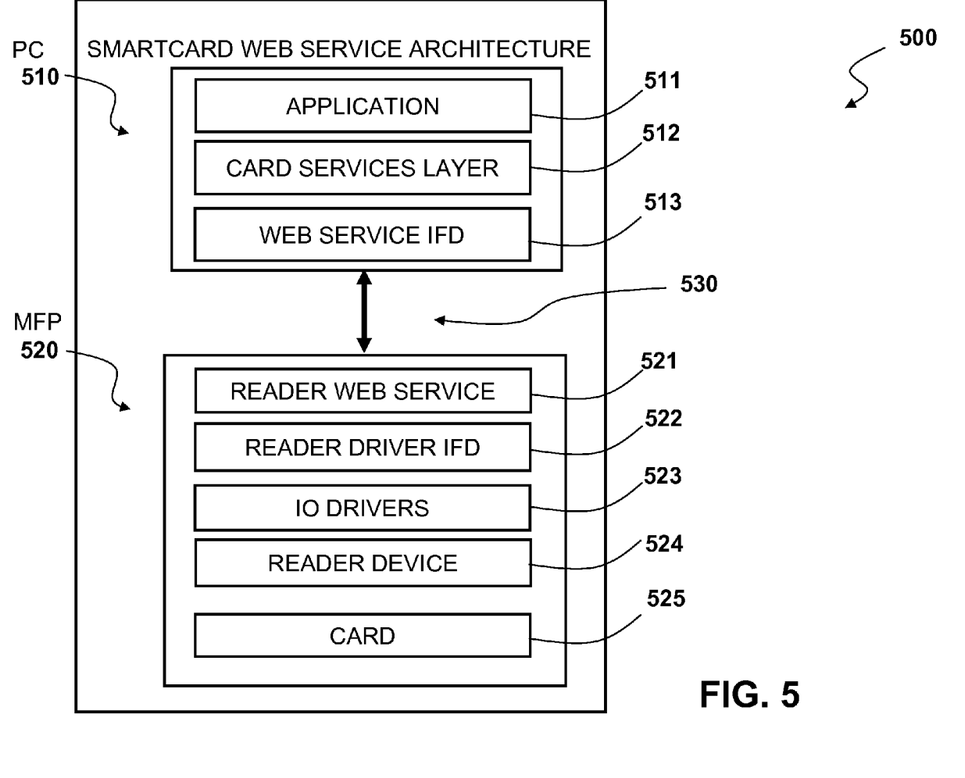
FIG. 5 is a depiction of smartcard web service layer architecture.

Relative to a local computing machine such as a PC, a remote machine, such as an MFP, may comprise the communication software layer specific to the smartcard reader hardware and IO connection, and may provide a web service interface to the reader from a relatively remote machine, such as the PC. The application server on the network, e.g., running on the PC, may access the smartcard reader on the relatively remote machine, e.g., on the MFP, by engaging the smartcard reader web service on the MFP. FIG. 5 shows a top-level diagram of an exemplary smartcard web service architecture 500 where the PC 510 comprises the application layer 511, the card services layer 512, and the web service IFD 513, and the MFP 520 comprises the reader web service 521, the reader driver IFD 522, the IO drivers 523, the reader device 524, and accordingly is configured to receive the smartcard 525. The PC 510 and MFP 520 are shown in network communication via a communication link 530 and communicating according to SOAP.

The web service may be provided using the industry standard SOAP protocol. SOAP may be used with numerous transport protocols, and is widely used over HTTP. SOAP over HTTP supports communication through proxies and firewalls, and is a commonly applied protocol for web services. The web service may be made publicly available to other machines on the network using a Web Service Description Language (WSDL), and the application server may accordingly access the smartcard reader on the remote machine using the web service SOAP methods as part of the WSDL.

Figure 6:
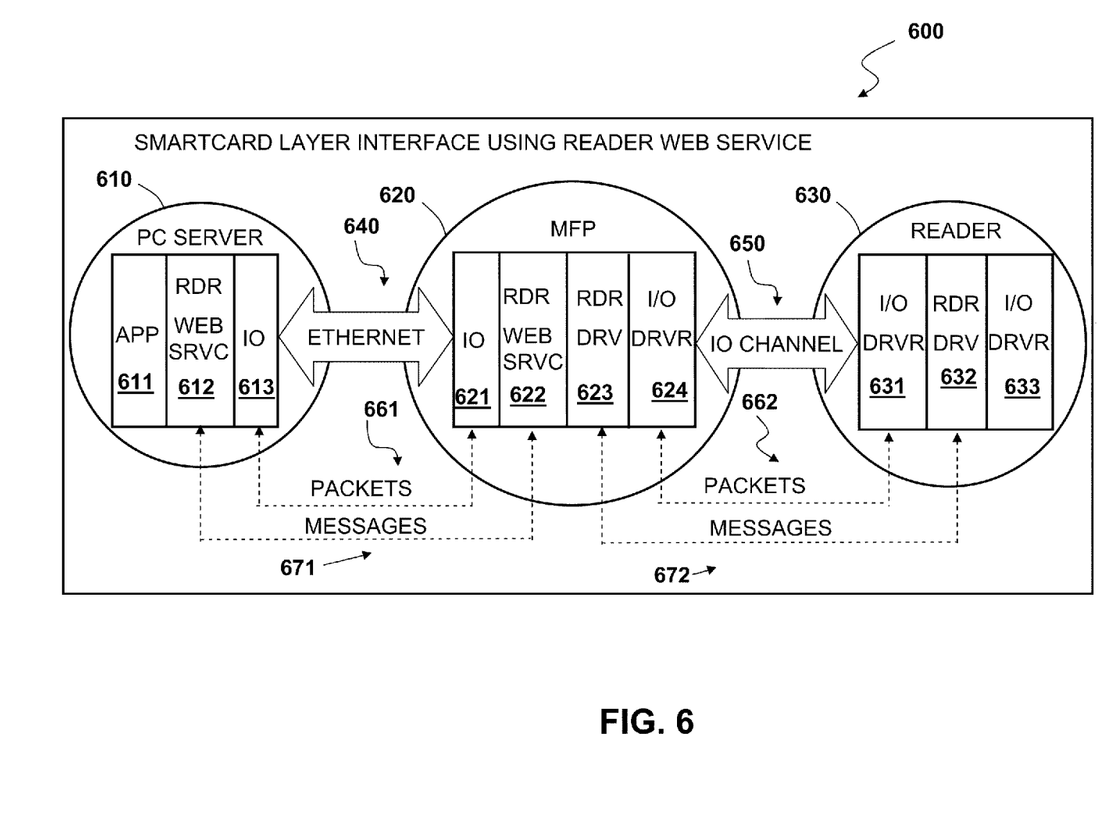
FIG. 6 is a system depiction of the smartcard layer interface using reader web service.

An exemplary layered architecture for the smartcard system is one that may be split such that the remote machine to which the reader is attached provides the reader drivers that interface directly to the reader, and the application server on the network provides the reader drivers that utilize the smartcard web service of the remote machine. FIG. 6 shows an exemplary smartcard system 600 comprising a computing device such as a PC functioning as a server 610, an MFP 620, and a smartcard reader 630. The PC 610 is shown comprising an application 611, a reader web service 612, and IO 613. The MFP 620 is shown comprising IO 621, reader web service 622, a card reader driver 623, and an I/O driver 624. The reader 630 is shown comprising an I/O driver 631, a card reader driver 632, and a second IO driver 633. The PC server 610 is shown in network communication with the MFP via a networks link, e.g., an ETHERNET™ connection 640. The MFP 620 and the smartcard reader 630 are shown in communication via an IO channel 650. The PC server IO 613 and MFP IO 621 are shown communicating via packets 661. The MFP I/O driver 624 and the card reader I/O driver 631 are shown communicating via packets 662. The PC server reader web service 612 is shown communicating via messages 671 with the MFP reader web service 622. The MFP card reader driver 623 is shown communicating via messages 672 with the reader card reader driver 632.

Accordingly, the example of FIG. 6 shows the layered architecture for the smartcard system 600 split such that the remote computing machine to which the reader is attached, e.g., the MFP, provides the reader drivers that interface directly to the reader, and the application server on the network, e.g., at the PC, may provide the reader drivers that engage the smartcard web service. The remote machine, such as an MFP in this example, may provide three functional components for the attached smartcard reader: (1) the low-level communication protocol 10 drivers specific to the reader hardware; (2) the low-level communication software reader drivers specific to the reader firmware; and (3) the Web Service interface to the smartcard reader. The application server may provide the reader drivers that engage the smartcard web service on the MFP. The reader drivers on the application server may interface with the reader hardware on the MFP through the smartcard web service.

Embodiments of the present invention have the MFP functioning as the host machine to which the reader is attached. Accordingly, the MFP may provide the low-level I/O drivers for communicating to the reader hardware. So, as to the communication protocol layer having the I/O drivers, the low-level I/O drivers employed are generally determined based on the actual hardware connection between the MFP and the reader. This connection may be USB, RS232, PCMCIA, or another connection type available in the industry. The connection between the reader and the MFP may be termed the IO Channel.

Figure 7:
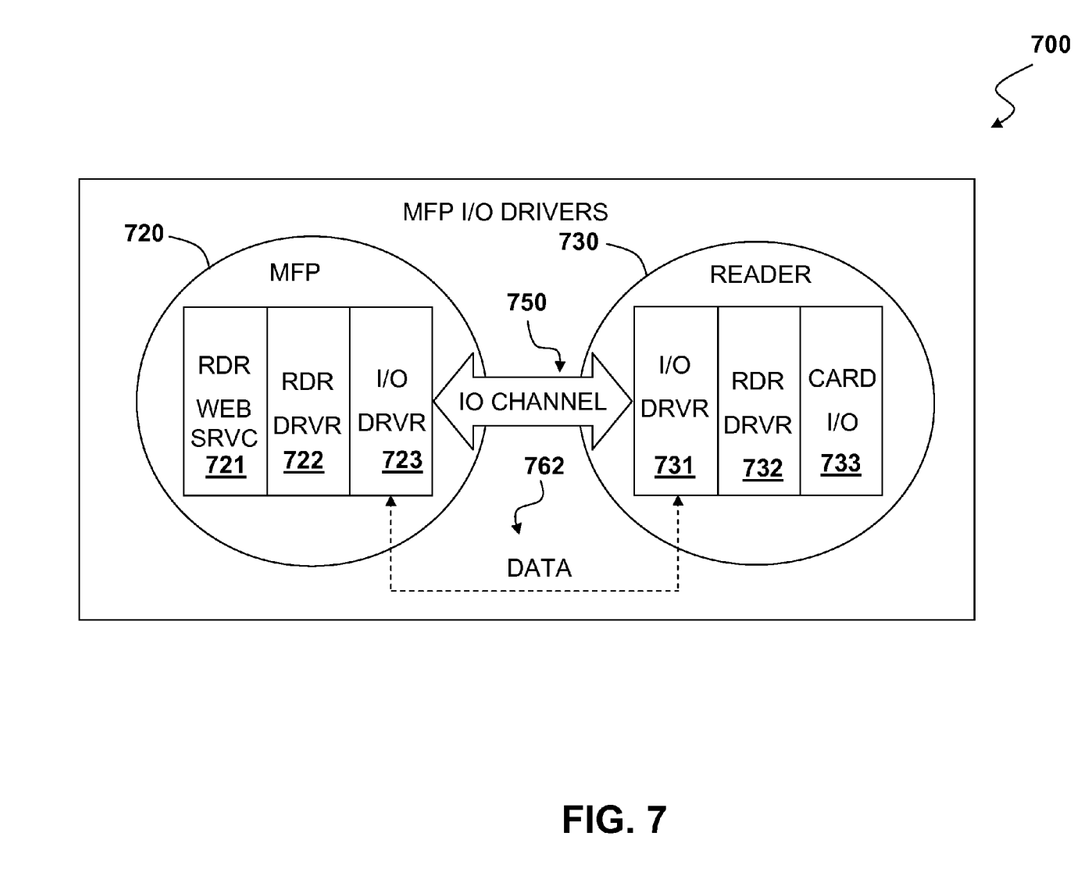
FIG. 7 is an MFP-reader interface depiction of the data communication via an IO channel between the I/O drivers.

FIG. 7 shows an exemplary functional block diagram 700 illustrating the division of the functional layers between the smartcard-based application server and the MFP that supplies the smartcard reader. FIG. 7 shows exemplary I/O driver counterparts within the MFP and Reader domains. MFP I/O driver counterparts may be disposed according to FIG. 7 that shows a functional block diagram 700 of an MFP 720 in communication with a reader 730 via an IO channel 750. The exemplary MFP 720 comprises a reader web service 721, a reader driver 722, and an I/O Driver 723. The exemplary reader 730 comprises an I/O driver 731, a reader driver 732, and a card I/O 733. The MFP I/O driver 723 and the reader I/O driver 731 are shown in communication via data 762.

Figure 8:
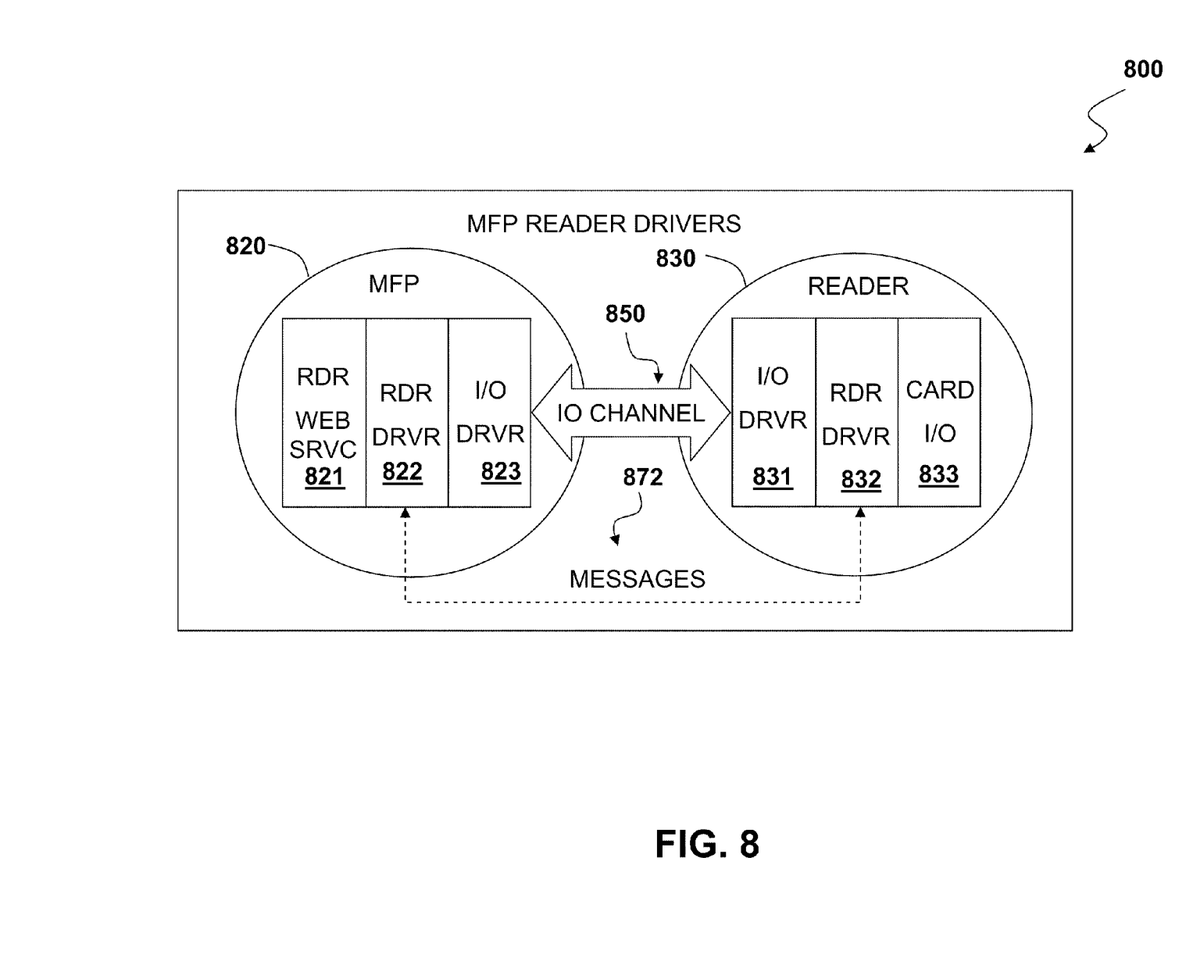
FIG. 8 is an MFP-reader interface depiction of the messages via an IO channel between the reader drivers.

In addition to the I/O drivers, the MFP may provide reader drivers as part of the communications software layer. Reader drivers are specific to each hardware device, and generally are necessary for sending and receiving reader-specific data packets. For example, for USB readers that support CCID, the MFP may provide the CCID drivers for sending and receiving reader-specific data packets. For readers that emulate a USB keyboard, the MFP may provide the keyboard drivers that read the data keystrokes from the reader. FIG. 8 is an exemplary diagram of the communication software layer 800 that may be within the MFP. MFP reader driver counterparts may be disposed; according to FIG. 8 that show a functional block diagram 800 of an MFP 820 in communication with a reader 830 via an IO channel 850. The exemplary MFP 820 comprises a reader web service 821, a reader driver 822, and an I/O Driver 823. The exemplary reader 830 comprises an I/O driver 831, a reader driver 832, and a card I/O 833. The MFP reader driver 822 and the reader driver 832 are shown in communication via messages 872.

The following lists some of the functions provided by the MFP reader driver. Although the functions listed here are specific to CCID-type reader devices, this invention is not limited to only to CCID readers, and may include numerous other functions dictated by the particular reader device. Sample function APIs for CCID-Type readers: (a) PC_to_RDR_IccPowerOn; (b) PC_to_RDR_IccPowerOff; (c) PC_to_RDR_GetSlotStatus; (d) PC_to_RDR_XfrBlock; (e) PC_to_RDR_GetParameters; (f) PC_to_RDR_ResetParameters; (g) PC_to_RDR_SetParameters; (h) PC_to_RDR_Escape; (i) PC_to_RDR_IccClock; (j) PC_to_RDR_TOAPDU; (k) PC_to_RDR_Secure; (l) PC_to_RDR_Mechanical; (m) PC_to_RDR_Abort; (n) PC_to_RDR_SetDataRateAndClockFrequency; (o) RDR_to_PC_DataBlock; (p) RDR_to_PC_SlotStatus; (q) RDR_to_PC_Parameters; (r) RDR_to_PC_Escape; (s) RDR_to_PC_DataRateAndClockFrequency; (t) RDR_to_PC_NotifySlotChange; and (u) RDR_to_PC_HardwareError.

As for a reader web service, the MFP may also be configured to provide a Web Service Interface to the MFP reader drivers. So, the sample functions listed above may be exposed, i.e., made available, using web service SOAP methods. The following are sample SOAP methods for CCID-type devices: (a) WS_IccPowerOn; (b) WS_IccPowerOff; (c) WS_GetSlotStatus; (d) WS_XfrBlock; (e) WS_GetParameters; (f) WS_ResetParameters; (g) WS_SetParameters; (h) WS_Escape; (i) WS_IccClock; (j) WS_TOAPDU; (k) WS_Secure; (l) WS_Mechanical; (m) WS_Abort; (n) WS_SetDataRateAndClockFrequency; (o) WS_DataBlock; (p) WS_SlotStatus; (q) WS_Parameters; (r) WS_Escape; (s) WS_DataRateAndClockFrequency; (t) WS_NotifySlotChange; and (u) WS_HardwareError. Although the preceding web service methods may be specific to a CCID-type reader, the invention in its several embodiments is not limited only to CCID-type devices, and may include additional or alternative web service methods appropriate for the particular MFP.

The remote machine, such as an MFP, provides a smartcard web service and may broadcast the availability of this service to other nodes on the network. In one aspect of this invention, the broadcast may occur only when the reader hardware is attached to the remote machine. The remote machine may include, as part of the broadcast, the following information to the application server: (a) Network IP; (b) Reader type; (c) Reader name; (d) Device type; and (e) Reader Instance Identifier.

The PCSC application server receives notification of the availability of the reader service on the remote machine. In one instance, the notification may be provided using the industry-accepted WS-Discovery. The application server extracts the network port of the smartcard service and installs the smartcard drivers for that port. After receiving notification from the remote machine of the availability of the reader device, the PCSC application server adds the smartcard as an ICC resource to the ICC resource list. The device is added in accordance with the PCSC specification for ICC Resource Manager, and includes the following method:

```
RESPONSECODE IntroduceReader(
    IN STR ReaderName   // Friendly name to be associated with the
                        // reader
    IN STR DeviceName   // System-specific name of the reader device.
                        // Should conform to OS-specific naming
                        // conventions.
```

The reader name to be associated with the remote smartcard reader is unique for each remote device. In one aspect, the reader name may be associated with the remote machine network port. The remote machine also notifies the PCSC application server of the removal of the reader device from the remote machine. After receiving notification of the removal of the reader, the application server removes the reader and all associated card resources from the ICC resource list. The device is removed in accordance with the PCSC specification for ICC Resource Manager, and includes the following method:

```
RESPONSECODE ForgetReader(
    IN STR ReaderName   // Friendly name to be associated with the
                        // reader
```

Figure 9:
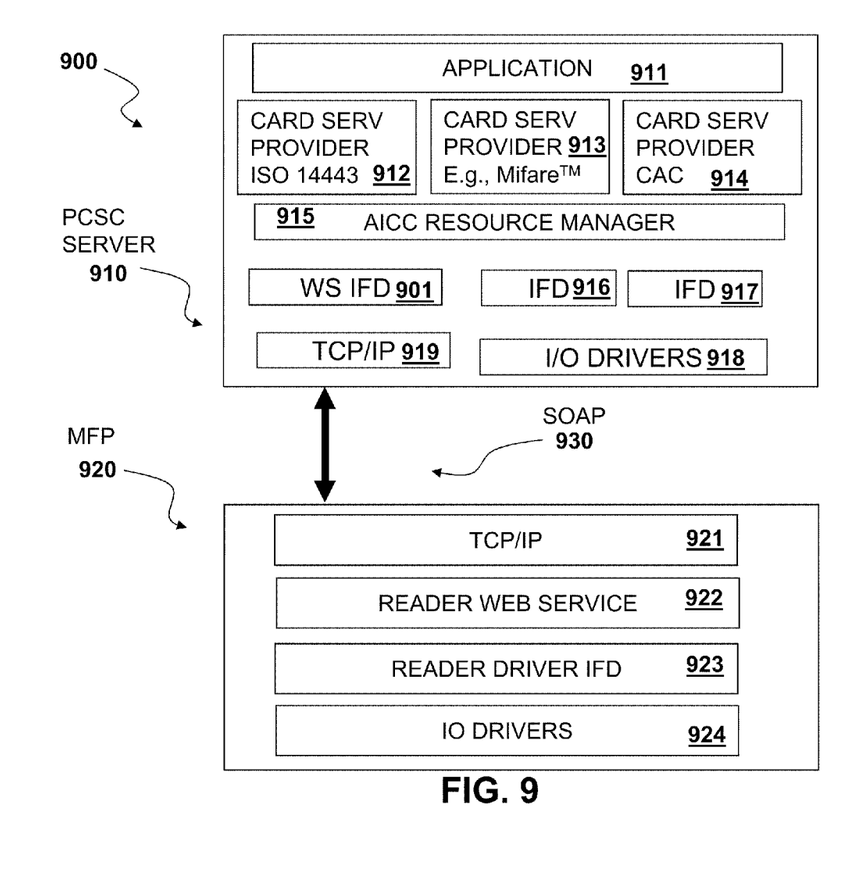
FIG. 9 is a depiction of the PCSC Server—MFP layered architectures.

FIG. 9 is a diagram of an exemplary PCSC framework 900 showing the web-service reader driver (WSIFD) 901 within the PCSC server 910. The PCSC server 910 is shown comprising an application 911, card service provider 912 (ISO 14443), card service provider Mifare 913, card service provider CAC 914, an AICC resource manager 915, the web-service IFD 901, additional IFDs 916, 917, I/O drivers 918, and TCP/IP 919. The PCSC server is shown communicating with the MFP 920 via a network 930 using SOAP. The MFP 920 is shown comprising TCP/IP 921, reader web service 922, reader driver IFD 923 and 10 drivers 924.

The remote machine, such as the MFP, may comprise various operating systems, such as vxWorks and Linux. In addition to the firmware necessary for the proper function of the remote machine, the remote machine may provide networking functions, which include an HTTP server that processes XML/SOAP messages. The PC application server on the network may comprise a personal computer using various operating systems, such as Windows or UNIX. The PC application server may also be a workstation, a portable computer, or mainframe system. In addition to the computer-readable instructions for the proper functioning of the PC server, the PC server provides the PCSC smartcard software components and infrastructure to support smartcard applications.

The MFP, as an example of a remote machine, is equipped with a smartcard reader and some remote machines may be configured to support a plurality of reader devices connected to the MFP. Embodiments of the present invention are readily scalable to the remote machine having several readers.

In some embodiments, the application server on the network knows the IP address of the MFP, and issues SOAP methods to access the reader on the MFP. In some embodiments, the application server on the network listens for an available reader web service, installs the web-service-based drivers, and exposes the remote reader to the system device list. PCSC applications utilize the remote reader as if it were directly attached. Providing a web service interface to the smartcard reader on the remote device, and utilizing this interface within the PCSC framework on the application server, allows all the functionality of a smartcard application system within the remote machine without the baggage of the smartcard infrastructure within the remote machine. So, in some embodiments, the remote machine with the attached reader may broadcast, e.g., via WS Discovery, over the network the availability of the smartcard reader web service. The application server receives the notification of the web service on the remote machine, extracts the network port of the service, and installs the WS-based device drivers to utilize the extracted port of the service. The application server further adds the smartcard reader as an ICC resource to the system device list, which makes the reader device available to PCSC applications.

One of ordinary skill in the art will also appreciate that the modules and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computing device comprising:
a web service interface device layer comprising a resource manager and a web service interface device;
a communication channel configured to interface the web service interface device layer of the computing device with a web service interface device layer of a remote smartcard reader; and
a processing unit and addressable memory;
wherein the processing unit is configured to establish a web service interface, via the web service interface device layer, to the web service interface device layer of the remote smartcard reader, the web service interface device layer of the remote smartcard comprising a reader web service and a reader driver interface device.

2. The computing device of claim 1 wherein the computing device is logged into a computer network and wherein the processing unit is further configured to provide public availability of the reader web service interface to a remote computing device logged into the computer network.

3. The computing device of claim 2 wherein the processing unit is further configured to provide public availability of the reader web service interface to the remote computing device logged into the computer network by executing machine instructions according to a web service description language.

4. The computing device of claim 2 wherein the processing unit is further configured to receive, from an application server of a device logged onto the computer network, the web service interface device layer of the smartcard reader via the publicly available reader web service interface provided by the processing unit.

5. The computing device of claim 2 wherein the processing unit is further configured to broadcast via the computer network the public availability of the reader web service for accessing an interfaced smartcard reader.

6. The computing device of claim 2 wherein the processing unit is further configured to transmit, to an application server logged onto the computer network, a change in at least one of: an availability state of the smartcard reader and an interface state of the smartcard reader.

7. The computing device of claim 1 wherein the processing unit is further configured to provide public availability of the reader web service interface to a first remote computing device logged into the computer network and block concurrent access to an interfaced smartcard reader by a second remote computing device.

8. A computing device comprising:
a communication channel configured to interface with a computer network; and
a processing unit and addressable memory comprising a resource manager configured to maintain a system device list;
wherein the processing unit is configured as an application server and is further configured to: (a) receive, from a remote computing device, a web service interface to a web service interface device layer of a remote smartcard reader that is available; and (b) establish a resource, via the resource manager, in the system device list to make the remote smartcard reader available as a local resource to Personal Computer/Smart Card (PCSC) applications.

9. The computing device of claim 8 wherein the processing unit is further configured to transmit SOAP messages according to smartcard reader drivers of the application server to a remote computing device interfaced with the remote smartcard reader.

10. A method comprising:
determining, by a processor of a local processing device, the availability of a web service interface of a remote computing device to a web service interface device layer of a smartcard reader based on a broadcasted availability by the remote computing device;
configuring a resource manager at the local processing device for maintaining a system device list, wherein the resource manager is in communication with the web service interface device layer of the smartcard reader via establishing a web service interface; and
establishing a resource in the system device list by the local processing device based on the communication of the resource manager of the local processing device with the web service interface device layer of the smartcard reader.

11. The method of claim 10 further comprising:
configuring the local processing device as an application server.

12. The method of claim 11 further comprising:
making the resource available to the application server.

13. The method of claim 12 further comprising:
blocking concurrent access to an interfaced smartcard reader by a second remote computing device.

14. The method of claim 10 wherein the remote computing device is at least one of a printing device and a multi-functional peripheral (MFP) device.

15. A Personal Computer/Smart Card (PCSC) system comprising:
- a first computing device comprising:
  - a processing unit and addressable memory;
  - a smartcard-based application server layer;
  - a card service provider layer;
  - a web service interface device layer comprising a resource manager, a web service interface device, and an interface device; and
- a second computing device comprising:
  - a processing unit and addressable memory;
  - a web service interface device layer comprising a reader web service and a reader driver interface device;
- wherein the web service interface device layer of the second computing device is configured to interface with the web service interface device layer of the first computing device via establishing a web service interface through a communication channel; and
- wherein the resource manager of the first computing device is configured to maintain a system device list associated with the second computing device that are available to the first computing device and is in communication with the web service interface device layer of the second device via the established web service interface.

* * * * *